United States Patent [19]

Shibayama et al.

[11] 4,150,434
[45] Apr. 17, 1979

[54] MATRIX ARITHMETIC APPARATUS

[75] Inventors: Shigeki Shibayama, Yokohama; Tsutomu Kamimura, Kawasaki, both of Japan

[73] Assignee: Tokyo Shibaura Electric Co., Ltd., Tokyo, Japan

[21] Appl. No.: 794,477

[22] Filed: May 6, 1977

[30] Foreign Application Priority Data

May 8, 1976 [JP] Japan ..................... 51-52687
May 8, 1976 [JP] Japan ..................... 51-52689

[51] Int. Cl.² .................................. G06F 15/34
[52] U.S. Cl. ........................... 364/704; 364/728
[58] Field of Search .............. 235/156, 159, 160, 164, 235/168; 364/200, 704, 728, 736

[56] References Cited

U.S. PATENT DOCUMENTS

| | | | |
|---|---|---|---|
| 3,557,357 | 1/1971 | Porter | 364/200 X |
| 3,697,734 | 10/1972 | Booth et al. | 235/164 |
| 3,701,976 | 10/1972 | Shively | 364/200 |
| 3,748,451 | 7/1973 | Ingwersen | 235/156 |
| 3,794,984 | 2/1974 | Deerfield | 364/200 |

OTHER PUBLICATIONS

L. C. Higbie, "Vector Floating- Point Data Format", *IEEE Trans. on Computers*, vol. c-25, No. 1, Jan. '76, pp. 25-32.

*Primary Examiner*—David H. Malzahn
*Attorney, Agent, or Firm*—Finnegan, Henderson, Farabow & Garrett

[57] ABSTRACT

A matrix arithmetic apparatus which comprises a plurality of exclusive memories provided correspondingly to the respective items of a matrix or vector each including a plurality of elements in order to store element data corresponding to the elements. An arithmetic operation of $Y = A \cdot X + B$ is carried out with respect to the element data read out the memories wherein multiplication $(A \cdot X)$ and addition $\{(A \cdot X) + B\}$ of data representing the respective elements are undertaken by the exclusive arithmetic units by a pipe line system. Internal address computers corresponding to the memories are provided in order to determine a memory address of each of the memories from which a stored data is to be read out.

9 Claims, 11 Drawing Figures

FIG. 2

| 0 | 1   4 | 5        15 | 16 | 17 | 18 | 19 | 20 | 21  23 |
|---|-------|-------------|----|----|----|----|----|--------|
| XB | COMMAND | LOOP | A | X | B | Y | CHAIN | ///// |

FIG. 3

| | 0        15 | 16 FX/FL | 17 18 DS | 19 MC | 20        31 ELEMENTS | 32        47 INCREMENT | 48        63 MODULO |
|---|---|---|---|---|---|---|---|
| A | ADDRESS | | | | | | |
| X | " | " | " | " | " | " | " |
| B | " | " | " | " | " | " | " |
| Y | " | " | NOT USED | " | " | " | " |

FIG. 4

| 0 | 1 | 100 | 1 | 1 | 1 | 1 | 0 | ///// |
|---|---|-----|---|---|---|---|---|-------|
| X B | COMMAND | LOOP | A | X | B | Y | C | |

FIG. 5

| | (ADDRESS) | (FX/FL) | (DS) | (MC) | (ELEMENTS) | (INCREMENT) | (MODULO) |
|---|---|---|---|---|---|---|---|
| A | 0 | 0 | 0  0 | 1 | 1000 | 100 | 999 |
| X | 0 | 0 | 1  0 | 0 | 10 | 10 | 0 |
| B | 1010 | 0 | 0  0 | 0 | 100 | 1 | 0 |
| Y | 1110 | 0 | ///// | 0 | 100 | 1 | 0 |

MATRIX ARITHMETIC APPARATUS

This invention relates to a matrix arithmetic apparatus for calculating data representing the elements of each item of a matrix or vector.

A matrix or vector is defined to be a quantity expressed by a collection of elements each having a scaler value. Where data included in the matrix or vector are arithmetically processed in mathematics or in an applied field, customary practice is to carry out a simple form of multiplication or addition with respect to data representing the elements of each item of a matrix or vector. With the prior art matrix arithmetic apparatus, elements of each item of a matrix or vector are stored in the sequentially arranged addresses of a memory, and arithmetic operation of the matrix or vector is undertaken with the respective elements regarded to represent quite independent data. The known arithmetic apparatus can indeed easily carry out the arithmetic operation of data representing the individual elements of a matrix or vector, but has the drawback that where a matrix or vector has a large number of elements, then an arithmetic operation has to be repeated very frequently, consuming a great deal of time in completing a cycle of the arithmetic operation. Actually, however, structure calculation by the finite element method or calculation of a large number of elements by the partial differential equation involves calculation of data included in a matrix having a large number of elements. However, hardware computer technique available at present time takes too much time in processing data included in a matrix having a large number of elements. To date, therefore, no satisfactory arithmetic apparatus has been realized.

For instance, arithmetic processing of a data representing a single element of a matrix or vector by the conventional general purpose computer involves the undermentioned steps of calculation.

1. A data is fetched from a memory to be stored in a register.
2. A data fetched by the step 1 and another data supplied from any other data source are arithmetically processed. The latter data is sometimes stored in a memory or a register.
3. A result of arithmetic operation derived from the step 2 is stored in a memory.
4. Throughout the steps 1 to 3, address computation is carried out to have an access to the specified address of a memory.

Since calculation of a data representing even a single element involves the steps of 1 to 4, calculation of data representing an N number of elements included in a matrix or vector makes it necessary to repeat the above-mentioned four steps N times. Thus, the larger the number of N, the more increased to time of arithmetic operation.

It is accordingly the object of this invention to provide a matrix arithmetic apparatus capable of calculating data included in a matrix or vector efficiently and quickly.

According to an aspect of this invention, there is provided a matrix arithmetic apparatus which comprises; a high speed data channel for quickly transferring data to a host computer including a main memory; at least one internal memory for storing data representing the respective elements of a matrix or vector, operand data and data denoting the results or arithmetic operation; an address computer for updating the current address of the internal memory by hardware; a converter for converting a fixed point data read out from the main memory of the host computer into a floating point data; a register for storing data read out from the main memory and internal memory which represent at least two elements; at least one arithmetic unit for arithmetically processing the contents of the register; and a normalization register for normalizing an output signal from the arithmetic unit.

This invention can be more fully understood from the following detailed description when taken in conjunction with the accompanying drawings, in which:

FIG. 2 shows a control byte format used with the matrix arithmetic apparatus of the invention;

Figure 1:
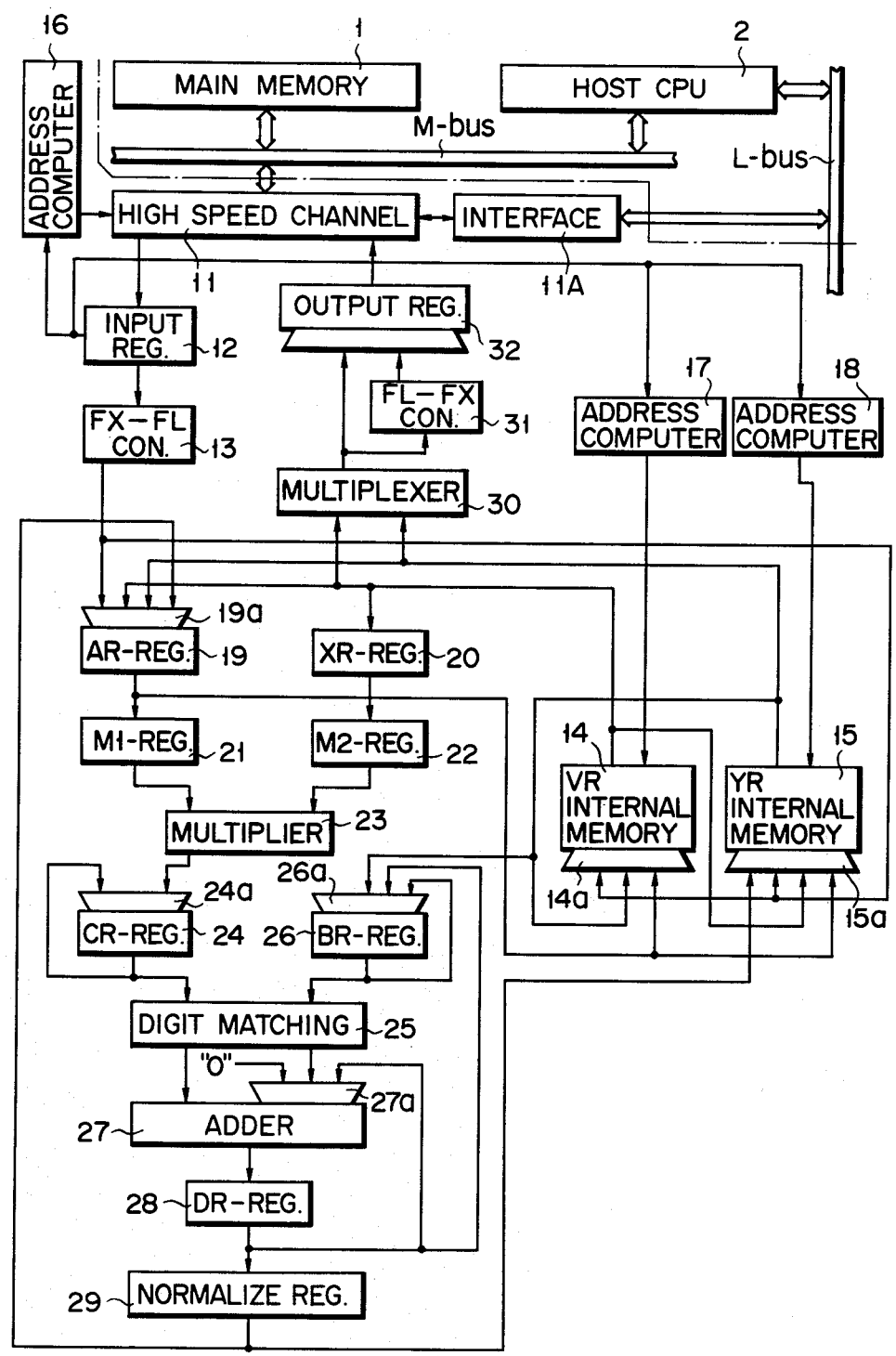
FIG. 1 is a block circuit diagram of a matrix arithmetic apparatus according to one embodiment of this invention.
Figure 6A:
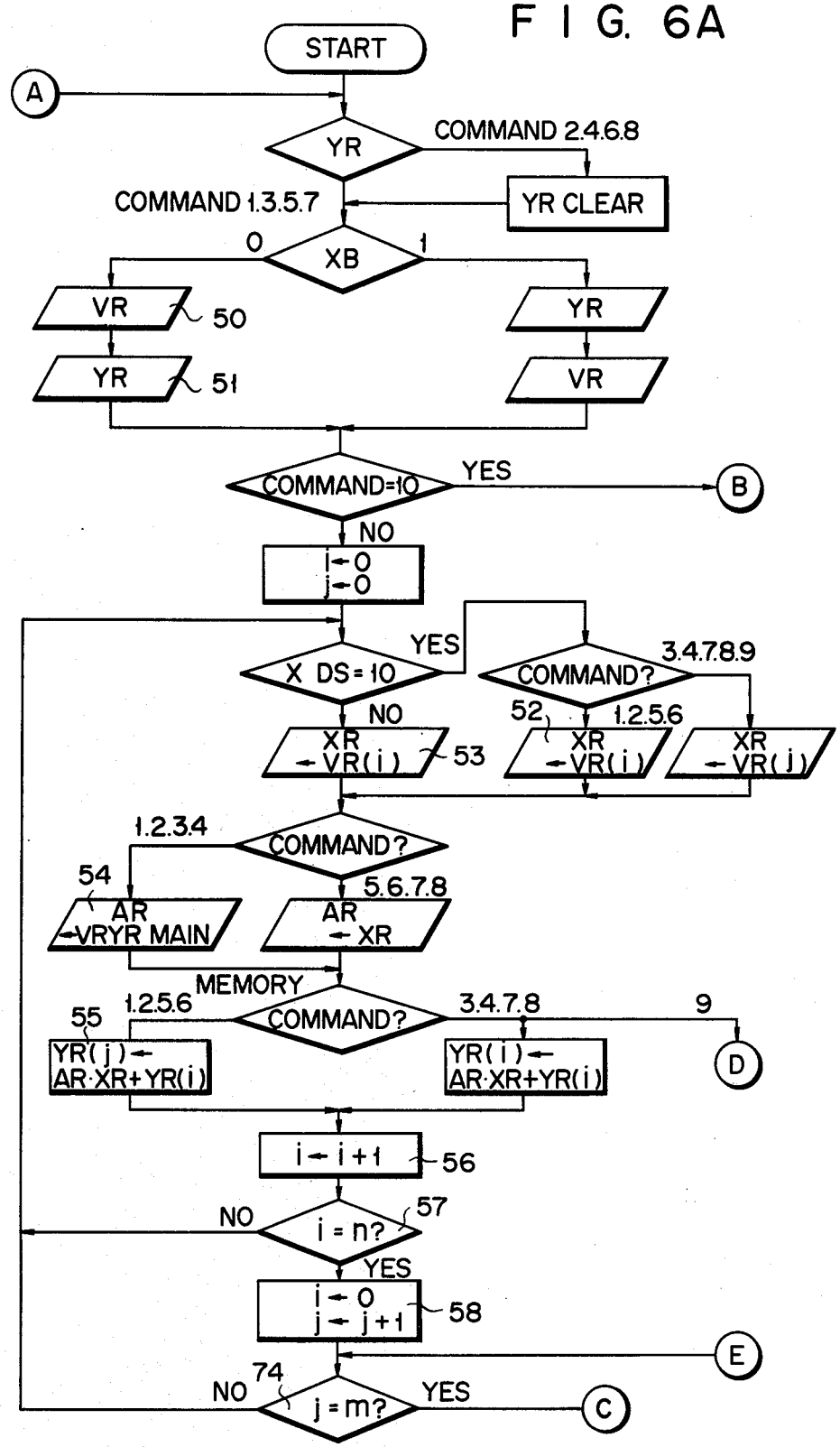
Figure 6B:
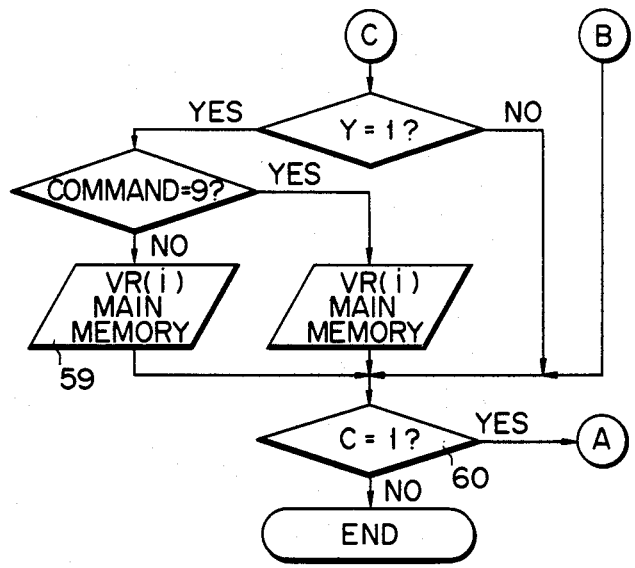
Figure 6C:
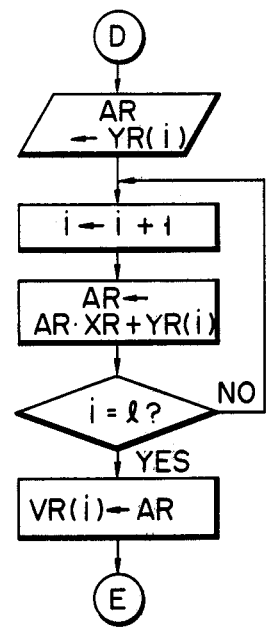
Figure 7:
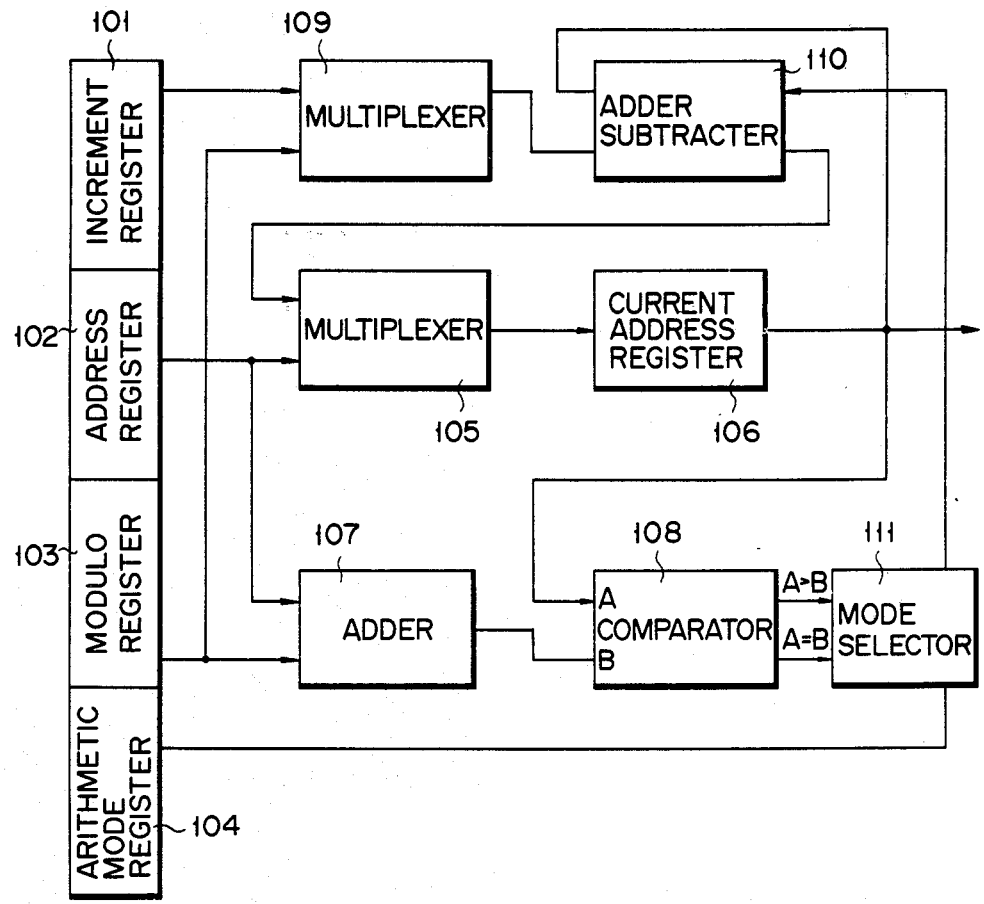
Figure 8:
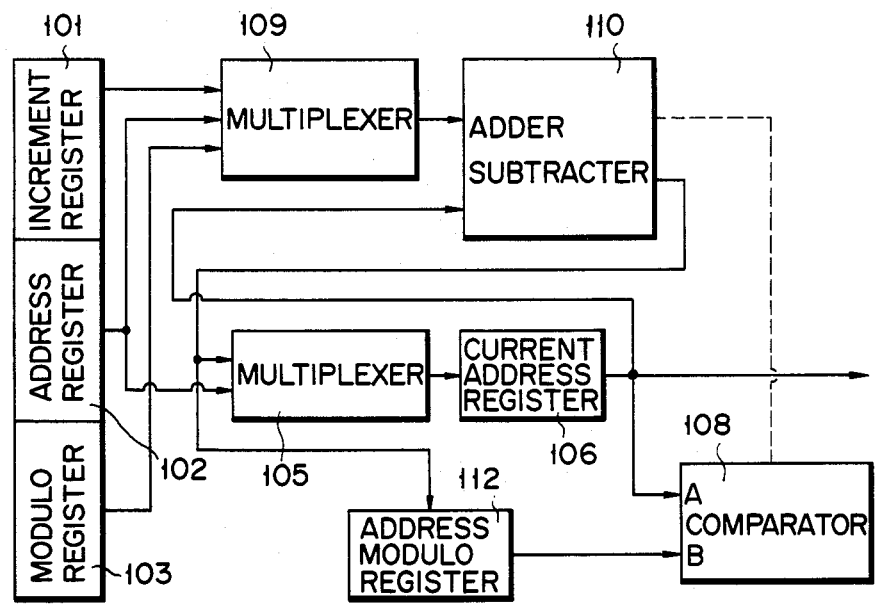
Figure 9:
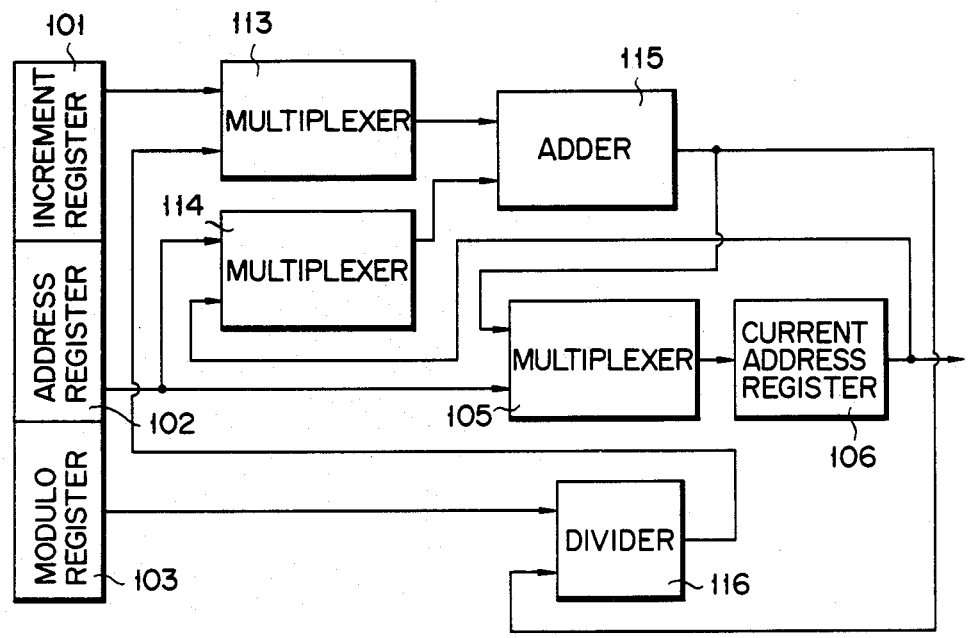

FIG. 3 indicates a data information byte format arithmetically processed by the matrix arithmetic apparatus;

FIGS. 4 and 5 present control byte and data information byte formats representing data in actual use;

FIGS. 6A, 6B and 6C are flow chart illustrating the sequential operation steps of the matrix arithmetic apparatus of the invention;

FIG. 7 is a block circuit diagram of an address computer used with the matrix arithmetic apparatus of the invention; and FIGS. 8 and 9 are block circuit diagrams of address computers according to other embodiments of the invention which are used with the matrix arithmetic apparatus of FIG. 1.

According to this invention, arithmetic operation of data included in a matrix or vector is carried out by the steps of reading out data representing the elements of each item of the matrix or vector from a main memory or internal memory according to addresses specified by address computers for updating the addresses of these memories; undertaking multiplication and addition of data thus read out by an exclusive multiplier and adder in a pipe line system; and causing the results of arithmetic operation to be stored in the specified addresses in succession.

Referring to FIG. 1, a high speed channel 11 is connected to a main memory 1 and host CPU 2 included in a host computer through a memory bus M-bus and also to the host CPU 2 through an interface 11A and line bus L-bus. The high speed channel 11 is further connected to a fixed- to floating-point converter (abbreviated as "FX to FL converter") 13 through an input register 12. The output terminal of the input register 12 is connected to address computers 16, 17, 18 for updating the addresses included in the main memory 1 of the host computer, VR internal memory 14 and YR internal memory 15. The FX to FL converter 13 is connected to the VR and YR memories 14, 15 and AR register 19 through multiplexers 14a, 15a and 19a. This AR register 19 is stored through the FX to FL converter 13 with data read out from the main memory 1 or data read out from the VR or YR internal memory 14 or 15. An XR register 20 is stored with data fetched from the VR internal memory 14. The output terminals of the AR register 19 and XR register 20 are connected to a multiplier 23 through an M1 register 21 and M2 register 22 respectively, causing the contents of the AR register 19 and the XR register 20 to be multiplied by each other. An output signal from the multiplier 23 is supplied through a CR register 24 to a digit-matching circuit 25, together with an output signal from a BR register 26.

The BR register 26 is connected to the YR internal memory 15 through a multiplexer 26a to fetch data therefrom. The digit-matching circuit 25 undertakes digit-matching between the result data of multiplication by the multiplier 23 which is read out from the CR register 24 and the data which is read out from the YR internal memory 15. After digit-matching, these data are supplied to an adder 27 to be added together. The result of addition by the adder 27 is supplied through a DR register 28 to a normalization register 29 and through multiplexers 27a and 26a to adder 27 and BR register 26 respectively. The output terminal of the normalization register 29 is connected to the AR register 19 and YR internal memory 15 through multiplexers 19a and 15a to cause data normalized by the normalization register 29 to be stored in the AR register 19 or YR internal memory 15. Output signals from the VR and YR internal memories 14, 15 are supplied to an output register 32 through a multiplexer 30 and a floating- to fixed-point converter (abbreviated as "FL to FX converter") 31 or only through the multiplexer 30. The output register 32 is connected to the main memory 1 of the host computer through the high speed channel 11.

The matrix arithmetic apparatus of this invention arranged as described above is operated according to the contents of the control byte and data-information byte formats illustrated in FIGS. 2 and 3 respectively. Prior to description of the operation, there will first be explained the control byte and data-information byte formats.

Control byte format

XB: This XB is an instruction on the order in which data are to be fetched to the VR and YR internal memories 14, 15. If having, for example, a binary "0", at first, data are transferred to VR internal memory from a data source specified by DIB and then to YR internal memory in the same manner.

COMMAND: This field means a fundamental command for the arithmetic operation of data included in a matrix, and gives the undermentioned ten forms of instruction:

(1) $yj = \sum_{i=1}^{n} AjiXi + Bj \ (j = 1, 2, ... m)$ (2) $yj = \sum_{i=1}^{n} AjiXi$ (3) $yj = AjXj + Bj$
(4) $yj = AjXj$ (5) $yj = \sum_{i=1}^{n} X^2i + Bj \ (j = 1)$ (6) $yj = \sum_{i=1}^{n} X^2i$ (7) $yj = X^2j + Bj$
(8) $yj = X^2j$ (9) $yj = \sum_{i=1}^{n} AiX_j^{n-i}$

(10) transfer of data

LOOP: This field indicates a result of an arithmetic operation, that is, a numerical value of j shown in the above-listed ten instructions.

A, X, B, Y: Each of these fields indicates whether it is necessary to fetch an instruction corresponding to any of the A, X, B and Y of the data-information byte of FIG. 3.

CHAIN: This CHAIN, when having a binary "1", causes a control byte and data-information byte immediately following that which is successively stored in the preceding control byte and data-information byte to be fetched without being conducted through the host CPU in order to continue an arithmetic operation.

Data-information byte format

ADDRESS: With respect to the fields A, X, B of data-information byte format of FIG. 3, this ADDRESS gives binary information representing a starting address included in the main memory or VR or YR internal memory from which a starting data is to be fetched. With respect to the Y of data-information of FIG. 3, this ADDRESS gives a starting address of the main memory for storing the results of arithmetic operations from which a starting data is to be fetched.

FX/FL: With respect to the above-mentioned A, X, B, this FX/FL shows whether a data transferred from the main memory 1 is a fixed point data or floating point data. If denoting a binary "1" or a fixed point data, the transferred data is converted into a floating point data by the FX to FL converter 13. With respect to the Y, the data to be transferred to the main memory are transferred with a floating point format or converted into a fixed point format.

DS: This DS denotes a data source from which a data is to be fetched with respect to any of the aforesaid A, X, B. If represented by binary information given below, an instruction relative to the DS has the following meanings:
 00 = data is stored in the main memory 1
 01 = data is stored in the AR register 19
 10 = data is stored in the VR internal memory 14
 11 = data is stored in the YR internal memory 15

The A of the data-information byte format of FIG. 3 given as instruction for data to be successively fetched to the AR register 19. Where the DS is denoted by a binary "01", then the AR register 19 itself constitutes a data source. Consequently, the AR register 19 does not undertake any transferring action. Namely, data previously stored in the AR register 19 remain intact. Where the DS corresponding to the X of the data-information byte format of FIG. 3 which gives an instruction for data to be fetched to the VR memory 14 has a binary "10", then data previously stored in the VR memory 14 remain intact. When brought into an arithmetic operation routine, the subject matrix arithmetic apparatus gives an instruction for data to be stored in the XR register 20. Where the DS corresponding to the B of the data-information byte format of FIG. 3 which gives an instruction for data to be fetched to the YR internal memory 15 is represented by a binary "11", then the YR internal memory 15 itself constitutes a source of data.

MC: This represents address computation used the modulo when represented by a binary "1".

INCREMENT: This INCREMENT gives information representing an additional data being used in address computation when a data is to be fetched from the main memory 1 or VR or YR internal memory 14 or 15.

MODULO: This represents an information used when a modulo arithmetic is set. The address computation used a modulo is a control method applied in updating a current address included in the main memory 1 or VR or YR internal memory 14 or 15. Now let it be assumed that the main memory 1 is stored with, for example, the following matrix A of data $$A = \begin{pmatrix} a_{11} & a_{12} & a_{13} \\ a_{21} & a_{22} & a_{23} \\ a_{31} & a_{32} & a_{33} \end{pmatrix}$$

in the form of a column vector series, that is, in the serial arrangement of $a_{11}\text{-}a_{21}\text{-}a_{31}\text{-}a_{12}\text{-}a_{22}\text{-}a_{32}\text{-}a_{13}\text{-}a_{23}\text{-}a_{33}$. In this case, it is sometimes desired to read out the column vector series in the form of a row vector series, that is, in the form of $a_{11}\text{-}a_{12}\text{-}a_{13}\text{-}a_{21}\text{-}a_{22}\text{-}a_{23}\text{-}a_{31}\text{-}a_{32}\text{-}a_{33}$. In such case, it is necessary to compute the serial numbers of those of the addresses of the main memory 1 from which data are to be read out. This address computation has hitherto been carried out by software. However, address computation by software has been found inefficient. With the matrix arithmetic apparatus of this invention, therefore, address computation is effected by an address computation using a modulo, that is, an arithmetic operation based on a residue. This address computation using a modulo is carried out by the steps of comparing a value 0 arrived at by adding together the serial number of a current address and a number of a required increment with a value P arrived at by adding together the serial number of a starting address from which a starting data is to be fetched and a number of a modulo; in case of $0 > P$, carrying out to subtract a modulo from the above-mentioned addition value 0; and using the resultant residue as an updated current address. In a word, a residue is equivalently obtained by a subtraction.

There will now be described the modulo operation by reference to a concrete example. Now let it be assumed that a $3 \times 3$ matrix A ($=a_{ij}$) data are stored in the nine addresses 10 to 18 of the main memory 1 in the form of a column vector series, namely, in the serial order of $a_{11}\text{-}a_{21}\text{-}a_{31}\text{-}a_{12}\text{-}a_{22}\text{-}a_{32}\text{-}a_{13}\text{-}a_{23}\text{-}a_{33}$; that an increment is determined to be 3 and a modulo to be 8; the same number of 8 as the modulo is used as a residue; and that the starting address 10 is stored with a data $a_{11}$.

Then address computation is carried out as follows.

| Number of times of address computation | Computed serial number of address (update address) | Data being read out |
|---|---|---|
| 1st | 10 (starting address) | $a_{11}$ |
| 2nd | 10 + 3 = 13 | $a_{12}$ |
| 3rd | 13 + 3 = 16 | $a_{13}$ |
| 4th | 16 + 3 = 19 | |
| | (serial number of 19 current address) > 10 (serial number of starting address) + 8 (modulo) | |
| | Thus 19 − 8 = 11 | $a_{21}$ |
| 5th | 11 + 3 = 14 | $a_{22}$ |
| 6th | 14 + 3 = 17 | $a_{23}$ |
| 7th | 17 + 3 = 20 > 18 | |
| | 20 − 8 = 12 | $a_{31}$ |
| 8th | 12 + 3 = 15 | $a_{32}$ |
| 9th | 15 + 3 = 18 | $a_{33}$ |

Therefore, data stored in the form of the aforesaid column vector series can be read out in the order of a row vector series. This means that the matrix arithmetic apparatus of the present invention enables address computation to be carried out efficiently by hardware, without relying on software. Further description will later be given of the hardware used with the invention. There will now be described by reference to the flow charts of FIGS. 6A, 6B and 6C the operation of the matrix arithmetic apparatus of this invention which is arranged as shown in FIG. 1 and is supposed to be provided with a control byte format of FIG. 4 and a data information byte format of FIG. 5.

The first address of the main memory 1 which is stored with a command for defining the operation of the subject matrix arithmetic apparatus is connected to an interface 11A by a host CPU2. At this time, the subject matrix arithmetic apparatus is separated from the host CPU2 and begins operation independently. When connected to the first address, the interface 11A fetches a control byte instruction formed of three bytes as shown in FIG. 4. Later, a data information byte instruction formed of 32 bytes at maximum as shown in FIG. 5 which are stored in a series of addresses and define an operand for each term of an arithmetic operation form of A·X+B by reference to the control byte instruction.

In FIGS. 4 and 5, command, loop, address, element, increment and modulo information are shown by decimal numbers for convenience but are binary information in practice. An arithmetic operation is carried out with respect to the "COMMAND" of the control byte format of FIG. 4 thus fetched, namely, with respect to a following equation corresponding to the before-described command form (1), $$y_j = \sum_{i=1}^{10} A_{ji} X_i + B_j \; (j = 1, 2, \ldots\ldots 100)$$

Where the field "XB" of the control byte format is represented by a binary "0" when the above arithmetic operation is started, then a data is fetched to the VR internal memory 14 as shown in the state 50 of the flow chart of FIG. 6A. Since, however, the field "DS" of the data information byte format of FIG. 5 corresponding to the field X thereof is expressed by a binary information "10", data are not fetched to the VR memory 14. Instead, data previously stored in the VR memory 14 remain intact. Next, on the basis of an instruction on the field "B" a data is fetched to the YR internal memory 15 as shown in a state 51. Since the field "DS" corresponding to the "B" is represented by a binary information "00", a data is fetched from the main memory 1 to the YR memory 15. Throughout the field "B" of the data-information byte format of FIG. 5, the field "ADDRESS" is represented by a starting address number "1010"; "ELEMENT" have a number of 100; an "INCREMENT" indicates 1; and "MODULO" indicates 0. In the last mentioned data fetching, therefore, made control does not take place. Consequently, data stored in the address 1010 to 1109 of the main memory 1 are successively fetched to the addresses 0 to 99 of the YR memory 15. These data correspond to elements $b_1$ to $b_{100}$.

Under the above-mentioned condition, the succeeding arithmetic operation routine is commenced. At this time, a single data, for example, a data showing an element $x_1$ is set in the XR register 20. Since, at this time, the field "DS" corresponding to the "X" of the data-information byte format of FIG. 5 is denoted by a binary information "10", the VR memory 14 itself constitutes a data source. Thus, data are fetched from the VR memory 14 to the XR register 20 as shown in a state 52 of the flow chart of FIG. 6A. Throughout "X" of the data-information byte format of FIG. 5, the "ADDRESS" has 0; "INCREMENT" represents 10; and "MODULO" is 0. Therefore, for example, data $x_1 \ldots x_{10}$ stored in the addresses 0, 10, 20 ... of the VR memory 14 are in turn fetched to the XR register 20. Where the field "DS" corresponding to "X" of the data-information byte format of FIG. 5 is not represented by a binary information "10", then data are successively fetched to the XR register 20 as shown in a state 53 of FIG. 6A, starting with the address "0" of the VR memory 14, from those of the addresses progressively increased by the successive addition of an increment of 1. Later, the AR register 19 is stored with data. In this case, data fetching is carried out in a considerably different manner from the previously described case depending on the form of a command as shown in FIGS. 6A and 6B. Since the field "COMMAND" of the control byte format of FIG. 4 is represented by a binary information "1", the state 54 of the flow chart of FIG. 6A shows that data can be fetched from the main memory 1. VR memory 14 and YR memory 15. Since, however, the field DS corresponding to the "A" of the data-information byte format of FIG. 5 is denoted by a binary information "00", the main memory 1 itself constitutes a data source. Therefore, data, for example, $a_{ji}$ ($a_{11}, a_{12} \ldots a_{10010}$) are successively fetched from the main memory 1 to the AR register 19. In this case, data fetching is started with an address 0; an increment is taken to be 100; a modulo is set at 999; and elements have a number of 1000, namely, causing data fetching to be repeated 1000 times.

The above-mentioned data-fetching cycle may be concretely expressed as follows:

| Number of times of data fetching | Serial number of main memory addresses |
|---|---|
| 1st | 0 |
| 2nd | 100 |
| 3rd | 200 |
| . | . |
| . | . |
| . | . |
| 10th | 900 |
| 11th | 1 |
| 12th | 101 |
| . | . |
| . | . |
| . | . |
| 999th | 899 |
| 1000th | 999 |

Data read out from the main memory 1 are all fixed point data, and consequently are converted into floating point data by the FX to FL converter 13 and thereafter are stored in the AR register 19.

Data, for example, $a_{11}$ and $x_1$ stored in the AR register 19 and XR register 20 respectively are supplied to the multiplier 23 through the corresponding M1 register 21 and M2 register 22 to be multiplied by each other. A data $a_{11} \cdot x_1$ showing the product of multiplication by the multiplier 23 is conducted to the digit-matching circuit 25 through the CR register 24. The digit-matching circuit 25 undertakes digit matching between the $a_{11} \cdot x_1$ data and, for example, $b_1$ data supplied from the YR memory 15 through the BR register 26 to the digit-matching circuit 25. Thereafter, the $a_{11} \cdot x_1$ data and $b_1$ data are added together in the adder 27 to obtain a data $a_{11}x_1 + b_1$. Successively added data, for example, $b_1$, $b_2$, $b_3 \ldots$ are fetched from the YR memory 15 not by issuing a command, but from those of the addresses of the YR memory 15 which is progressively increased by addition of an increment of 1 each time. The addition data $a_{11}x_1 + b_1$ is stored in the DR register 28. Next, a formula $i + 1$ shown in a state 56 of FIG. 6A is computed to compare i with n (denoting a number of 10 in this example of address computation). In case of i≠n in a state 57, a succeeding data $x_2$ is fetched from the VR memory 14 to the XR register 20 as shown in the state 53 and a data $a_{12}$ is fetched from the main memory 1 to the AR register 19 as shown in the state 54. These data $a_{12}$ and $x_2$ are multiplied together by the multiplier 23. The product data $a_{12}x_2$ is added to a data $b_1$ fetched from the BR register 26 in the adder 27. At this time, the adder 27 adds together the aforesaid addition data $a_{11}x_1 + b_1$ already stored in the DR register 28 and the new addition data $a_{12}x_2 + b_1$. Thus an arithmetic operation is continued until i becomes equal to n. The result yj of this arithmetic operation cycle, that is, y1 corresponding to the first row vector is stored in an address 0 which is included in the YR memory 15.

Thereafter 1 is added to j as shown in a state 58 to carry out an arithmetic operation of y2 corresponding to the second row vector. At this time, i which has already reached 10 is brought back to zero. When the values of y1 to y100 corresponding to the first to the 100th row vectors are determined, the corresponding data are successively stored in the addresses 0 to 99 of the YR memory 15. Later, data stored in the YR memory 15 are successively transferred by reference to Y of the data-information byte format of FIG. 5 to the first address 1110 of the main memory 1 and then from 1111 to 1209 updated by successively adding an increment of 1, as shown in a state 59 of the flow chart 6B.

When transfer of data to the above-mentioned memories of the main memory 1 is brought to an end, then examination in a state 60 is made of the form of binary information representing a chain bit C. Where the chain bit C is found to have a binary "1", then chaining takes place. Namely, each succeeding control byte and data-information byte are fetched from the memories, and all operations relative to both forms of bytes continue to be carried out. Where the chain bit C is represented by a binary "0", then all arithmetic operations are brought to an end. Completion of the arithmetic operation is indicated by interruption of the host CPU2.

As mentioned above, the matrix arithmetic apparatus of this invention enables an arithmetic operation to be efficiently carried out by proper combination of the products and sums arrived at by multiplying and adding elements included in the matrix or vector. Further, provision of an exclusive multiplier and an exclusive adder makes it possible to carry out the multiplication and addition of every successive data substantially at the same time, that is, to admit of the pipe line system, thereby accelerating an arithmetic operation. Moreover, the present matrix arithmetic apparatus adopts a unique method of address computation used a modulo, thereby enabling, for example, a load on the memories arising from rearrangement of data previously set in the form of a row to that of a column or vise versa or storing frequency functions to be easily reduced without the necessity of making use of a special device based on a program.

There will now be detailed the operation of an address computer for updating an address by reference to FIG. 7 showing a block circuit diagram of the address computer. An increment register 101 is stored with information on an increment for defining an address immediately following a current address. An address register 102 is stored with a starting address from which a first data is to be fetched. A modulo register 103 is stored with a modulo used in address computation. Address computation is carried out on the basis of data stored in the above-mentioned registers 101, 102, 103 and a starting of the address register 102 is first selected out by multiplexer 105 and then transferred to a current address register 106. At this time, the modulo information stored in the modulo register 103 and the starting address stored in the address register 102 are added together by an adder 107. The resultant sum is delivered to a comparator 108. Where, under this condition, a current address is supplied from the current address register 106, then the first data is fetched from an external memory, for example, the main memory 1 of the host CPU2 or VR or YR internal memory 14 or 15. Where a succeeding data is to be fetched, a current address stored in the current address register 106 and an increment stored in the increment register 101 and selected out by another multiplexer 109 are subjected to addition or subtraction in an adder-subtracter 110 as need arises. The result of addition or subtraction undertaken by the adder-subtracter 110 is selected by the multiplexer 105 and supplied to the current address register 106. The current address (A) now stored in the current address register 106 and the updated address (B) supplied from the adder 107 are compared by a comparator 108. On the other hand, Mode information $A \leq B$ or $A > B$ stored in the mode register 104 is selected by a mode selector 111. Where selected mode information, for example, $A > B$ supplied from the mode selector 111 coincides with output mode information from the comparator 108, then the mode selector 111 sends forth an output signal to the adder-subtracter 110, which in turn calculates a value of a modulo. Namely, modulo stored in the modulo register 103 and selected out by the multiplexer 109 is subtracted from a current address stored in the current address register 106. The result of subtraction is again conducted to the current address register 106 through the multiplexer 105.

The aforesaid fetching of the succeeding data is carried out on the basis of an updated address obtained by the modulo computation and stored in the current address register 106.

There will now be described by reference to FIG. 8 an address computer according to another embodiment of this invention. The parts of FIG. 8 the same as those of FIG. 7 are denoted by the same numerals with the embodiment of FIG. 8, a starting address from which a first data is to be fetched and a modulo are added together by the adder-subtracter 110. The result of the addition is conducted to the address-modulo register 112. The reference address (sum of starting address and modulo) stored in the address-modulo register 112 is compared with the current address stored in the current address register 106 by the comparator 108. Where the result of comparison undertaken by the comparator 108 indicates, for example, $A > B$, then computation subtracting a modulo from A is carried out.

There will now be described by reference to FIG. 9 an address computer according to still another embodiment of this invention. With this embodiment, the current address stored in the current address register 106 and a starting address of the address register 102 from which a first data is to be fetched are selected by a multiplexer 114.

An output signal from the multiplexer 114 is supplied to one of the input terminals of an adder 115. The other input terminal of the adder 115 is supplied with an increment delivered from an increment register 101 through a multiplexer 113 or an output signal from a divider 116. This divider 16 carrier out division with a modulo supplied from a modulo register 103 taken as a divider and an output signal from the adder 115 as a dividend. An output signal from the divider 116 denoting a residue, if any, is sent forth to a multiplexer 113. The address computer according to the embodiment of FIG. 9 provides by the divider 116 the residue on which the address computation of this invention is based.

The matrix arithmetic apparatus of this invention provided with any of the above-mentioned three types of address computer easily and quickly carries out address computation by means of hardware.

The foregoing description relates to the case where the matrix arithmetic apparatus of this invention could execute the forms of command regarding fundamental arithmetic operations. However, depending on the information of the field DS of the data-information byte, the internal memory can be interchangeably used with ease. As viewed from the host computer, therefore, any complicated arithmetic operation can be undertaken by the chaining process in a single continuous cycle of arithmetic operation without conducting data through the host CPU2 each time. Throughout the above-mentioned embodiments, two internal memories were used. However, these internal memories can be replaced by a single large capacity memory or conversely by a larger number of internal memories. Further, excepting the case where data are transferred in the form of a block from the main memory to the internal memories, it is possible to apply a process which eliminates the necessity of fetching data from the address of the main memory. The multiplier and adder may be replaced by a subtracter. Further, these arithmetic operation devices may be so combined as to enable a complicated arithmetic operation by a single step.

What we claim is:

1. A matrix arithmetic apparatus coupled to a host computer which has a main memory said matrix arithmetic apparatus comprising a high speed channel connected to the host computer for quickly transferring data with said host computer; at least one internal memory for storing data corresponding to elements included in a plurality of items of a matrix or vector and operand data; a plurality of address computers connected to the main memory and internal memory, respectively, to compute the addresses included in said memories; a first register connected to the internal memory and connected through the high speed channel to the main memory for selectively storing element data stored in the internal memory and data readout from the main memory according to information on an operand; a second register connected to said internal memory for storing from the internal memory element data corresponding to different items from those of the element data stored in the first register; a multiplier connected to the output of said first and second registers for mutually multiplying element data read out from the first and second registers; and a first adder responsive to the multiplier and the internal memory for adding together information on the product of said multiplier and an element of another different item fetched from the internal memory according to an address determined by the corresponding address computer while the multiplier carriers out the multiplication of the succeeding data fetched from the first and second registers.

2. The matrix arithmetic apparatus coupled to a host computer having a main memory according to claim 1, wherein the internal memory is connected to the main memory to store the element data and operand data fetched from the main memory of the host computer through the high speed channel.

3. The matrix arithmetic apparatus coupled to a host computer having a main memory according to claim 1, wherein the address computers corresponding respectively to the main memory and internal memory compute addresses of said memories according to which data are transferred to the main memory showing the results of arithmetic operations which are stored in the internal memory.

4. The matrix arithmetic apparatus coupled to a host computer having a main memory according to claim 1, wherein each of the address computers comprises respectively an increment register for storing an increment determined for computation of an address; an address register for storing a starting address from which a starting data is to be fetched; a modulo register for storing information on a modulo; a current address register for storing a current address; an adder-subtracter responsive to the current address register and the increment register for adding together the current address and the increment to obtain a first addition data A; a second adder responsive to the starting address register and the modulo register for adding together the starting address and the modulo information to obtain a second addition data B; and a comparator connected to the adder-subtracter and the second adder for comparing the first and second addition data A and B; and said adder-subtracter being connected to the comparator and the modulo register for subtracting the modulo from the first addition data A in response to information denoting $A > B$ from said comparator to determine the following update current address and being connected to the address register and the comparator for supplying the first addition data A to the current address register as an update address in response to information denoting $A \leq B$ from said comparator.

5. The matrix arithmetic apparatus coupled to a host computer having a main memory according to claim 1, wherein each of the address computers comprises respectively an increment register for storing increment information used in computing an address from which a data is to be fetched; an address register for storing a starting address from which a starting data is to be fetched; a modulo register for storing information on a modulo; a current address register for storing a current address by which data corresponding to the current address is read out from the main memory and/or the internal memory; an adder-subtracter responsive to the address register and the modulo register for adding together the starting address and the modulo to obtain an information B; and a comparator connected to the current address register and the adder-subtracter for comparing the current address A with the information B; said adder-subtracter being further connected to the comparator, the increment register, the current address register and modulo register for adding the increment to the current address in response to information denoting $A \leq B$ from the comparator and subtracting the modulo from the current address in response to information denoting $A > B$ from the comparator to figure out an update current address.

6. The matrix arithmetic apparatus coupled to a host computer having a main memory according to claim 1, which further includes a normalizer connected to said adder for normalizing a sum of said addition and transferring data corresponding to the normalized sum to the internal memory.

7. The matrix arithmetic apparatus coupled to a host computer having a main memory according to claim 1, which further includes a converter connected between the first register and the main memory through the high speed channel for converting a fixed point data fetched from the main memory into a floating point data.

8. The matrix arithmetic apparatus coupled to a host computer having a main memory according to claim 1, which further includes a digit matching device connected between the multiplier and the adder for matching the digit of the result data from the multiplier and the digit of the data from the internal memory.

9. The matrix arithmetic apparatus coupled to a host computer having a main memory according to claim 1, wherein the adder has an input and an output connected to each other to allow an accumulative adding operation.

* * * * *